United States Patent [19]

Earley

[11] 4,385,474
[45] May 31, 1983

[54] THERMALLY AND SONICALLY INSULATING AND WEATHERPROOFING COVER FOR MOBILE HOMES

[76] Inventor: Ronald L. Earley, 212 Westbrook, Springfield, Ill. 62702

[21] Appl. No.: 833,367

[22] Filed: Sep. 14, 1977

Related U.S. Application Data

[63] Continuation-in-part of Ser. No. 703,945, Jul. 9, 1976, abandoned, which is a continuation-in-part of Ser. No. 589,342, Aug. 13, 1975, abandoned.

[51] Int. Cl.³ .................................................. E04D 13/16
[52] U.S. Cl. .................................................. 52/96; 52/3
[58] Field of Search ............... 428/322, 321, 320, 315, 428/96; 52/309.8, 302, 319, 3, 219, 94–96

[56] References Cited

U.S. PATENT DOCUMENTS

| | | | |
|---|---|---|---|
| 1,871,571 | 8/1932 | Weber | 52/3 |
| 2,635,562 | 4/1953 | Abramson | 52/3 |
| 3,298,433 | 1/1967 | Lemelson | 52/309.8 |
| 3,455,076 | 7/1969 | Clarvoe | 52/302 |
| 3,466,222 | 9/1969 | Curtis | 52/309.8 |
| 3,496,058 | 2/1970 | Schroter | 52/309.8 |
| 3,518,156 | 6/1970 | Windecker | 428/322 |
| 3,601,935 | 8/1971 | Cadwell | 52/309.8 |
| 3,726,754 | 4/1973 | Coglianese | 428/321 |
| 3,816,234 | 6/1974 | Winfield | 428/322 |
| 3,932,976 | 1/1976 | Steel | 52/309.8 |
| 3,958,754 | 5/1976 | Newcomb | 428/315 |
| 3,977,137 | 8/1976 | Patry | 52/319 |

OTHER PUBLICATIONS

Netherlands Application 0803549 to Schoop, Sep. 1968, 4 sheets of drawings, 6 pp. of specs.

Primary Examiner—John E. Murtagh
Attorney, Agent, or Firm—Ralph F. Staubly

[57] ABSTRACT

A thermally and sonically insulating and weatherproofing cover for the roofs of mobile homes or like buildings comprises preformed or molded-in-situ slabs of expanded polystyrene bonded to the original roof surface, and a Neoprene-impregnated-fabric lamina stretched over the slabs and having downturned margins fastened to the upper side surfaces of the side walls of the building. The lamina margins are preferably provided with reinforced selvages having grommets to receive screws to fasten the lamina in place. An obtuse-angled trim strip desirably is employed to cover the grommets and screw heads. A gutter channel may be provided and be positioned to receive the lower edges of the lamina and the trim strip.

3 Claims, 4 Drawing Figures

THERMALLY AND SONICALLY INSULATING AND WEATHERPROOFING COVER FOR MOBILE HOMES

This application is a continuation-in-part of identically entitled application Ser. No. 703,945 filed July 9, 1976, now abandoned which application was a continuation-in-part of Ser. No. 589,342, filed Aug. 13, 1975 now abandoned and entitled "Weather Guard Mobile Home Roof Protective Pad."

It is the object of the present invention to provide an inexpensive, easily installed, esthetically pleasing and highly effective and durable cover for the roofs of mobile homes or like buildings, which cover provides thermal and sonic insulation, and weatherproofing including hail-damage prevention.

DETAILED DESCRIPTION

Figure 1:
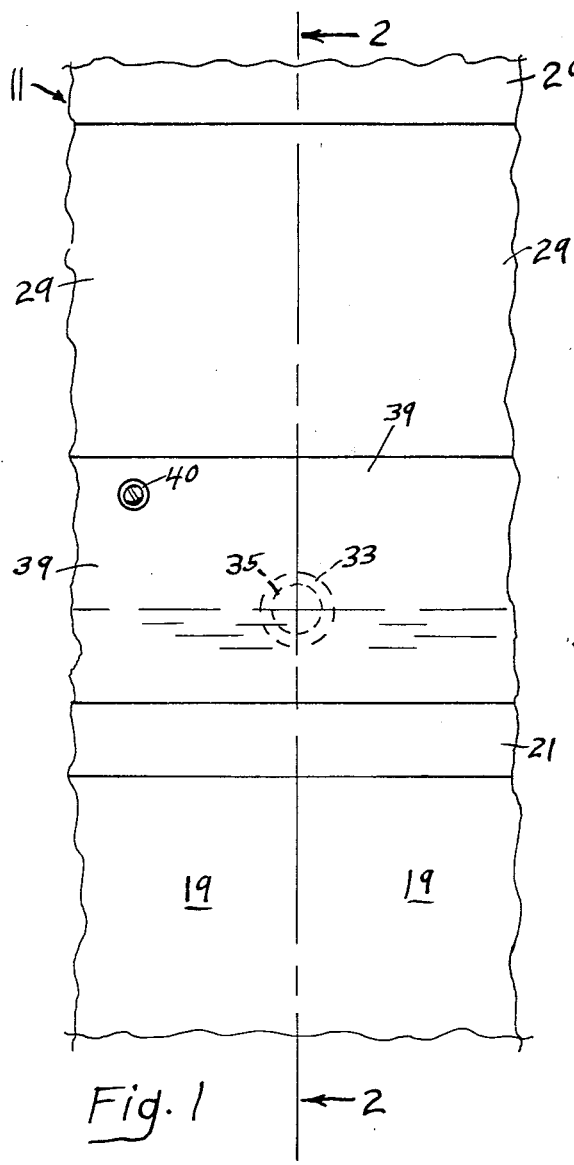
FIG. 1 is a front fragmentary elevational view of an eaves portion of an embodiment of the invention.

With reference now to the drawings, the numeral 11 generally designates the roof cover, and the numeral 13 the roof to be covered. The roof 13 comprises conventional 20- or 30-gauge aluminum or galvanized-iron sheeting 15 having a downturned flange 17 overlying the upper extremity of a metallic or composition siding panel 19. The lower portion of the flange 17 may be bent outwardly and then upwardly to define a rain gutter 21. Part 23 is a 2×4 stud which is capped by a 2×.4 roof support 25.

The roof cover 11 comprises a blanket 27 formed of preformed sheets or slabs of molded-in-situ expanded polystyrene, several inches thick. The slabs are preferably bonded to the original roof surface by adhesive material.

The cover lamina 29 is a tailored-to-measure preformed sheet of Neoprene-impregnated woven fabric (e.g. 16-oz). At least the upper surface of the lamina 29 has a surface highly reflective to radiant (sun-light) energy (e.g. by an aluminum-pigment coating). The lamina 29 and the blanket 27 are sufficiently resilient to safely resist damage by large hail stones.

The margin of the lamina 29 has a selvage 31 formed by underturning and overlapping its edge for approximately two inches and by cementing or otherwise joining the overlapped portions. At spacing of about twelve inches for the eaves margins and about eight inches for the gable margins, the selvages are provided with eyelets or grommets 33 to receive anchoring screws 35. A rubber washer 37 desirably seals the grommet aperture when the screw 35 is tightened.

Figure 2:
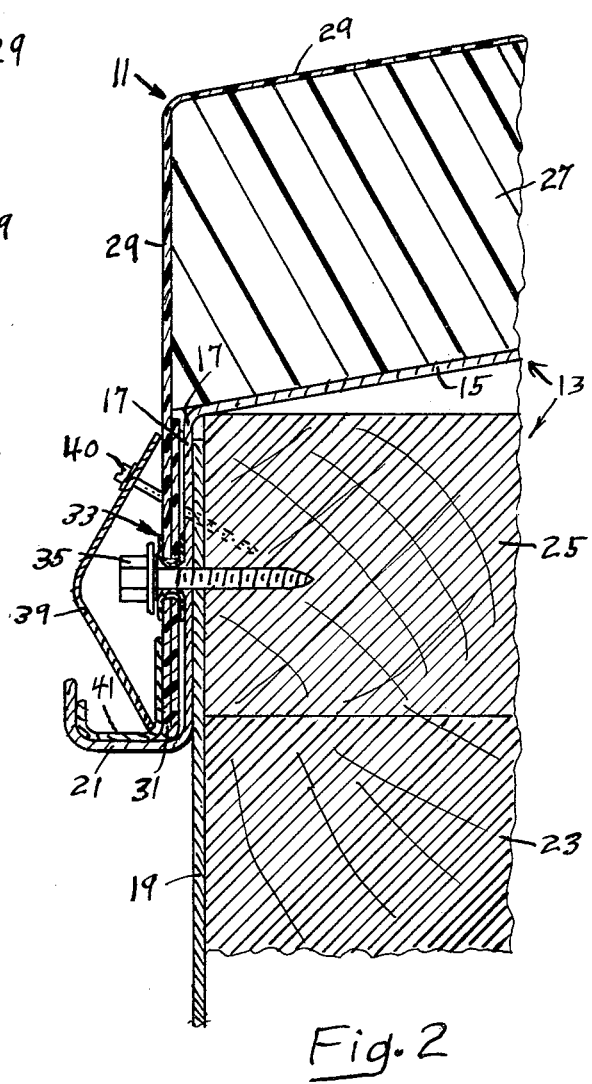
FIG. 2 is a end elevational view of the showing of FIG. 1 in section taken on the line 2—2 of FIG. 1.
Figure 3:
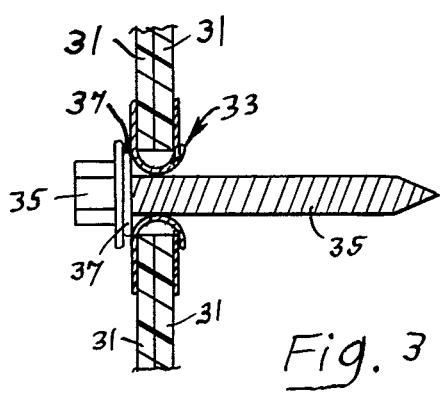
FIG. 3 is an enlarged view of the grommet and related elements of FIG. 2.

An obtuse-angled trim strip 39 of metal or plastic is desirably employed along with its anchoring screws 40 to cover the grommets and screws for esthetic value as well as for more firm anchoring of the margins of the lamina. A gutter channel 41 of metal or plastic can be cemented to the lower margin of the selvage 31 (FIG. 2) either for more firm anchoring of said margin or as a substitute for the original gutter channel 21 which is sometimes lacking. In either case the trim strip 39 will engage into the gutter channel 41 as shown in FIG. 2.

Figure 4:
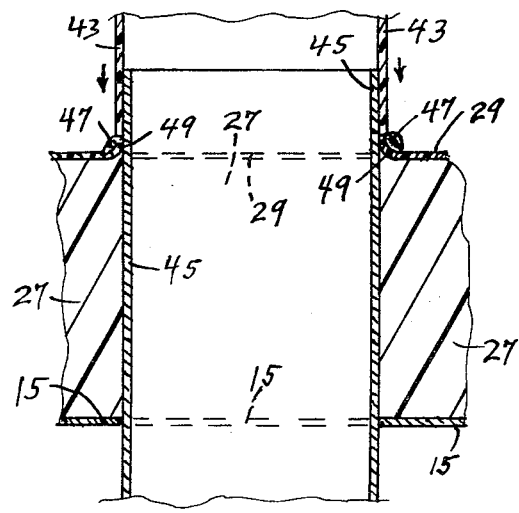
FIG. 4 is a fragmentary elevational view in axial section of a ventheight extender.

FIG. 4 discloses the use of a tube 43 of metal or plastic to extend the height of the original vent pipe 45 to compensate for its loss of height by the installation of the added roof cover. The extension tube 43 snugly fits over the pipe 45 and is slid down to its position of FIG. 4. Then caulking material 47 is added, and finally the tube is pressed down firmly against the upturned lip 49 of the lamina 29.

Having thus described my invention, I claim:

1. A laminated cover for thermally and sonically insulating and weather-proofing the roof of a mobile home or like building, said cover comprising: an at least one-inch-thick flexible blanket of hail-shock-absorbing and thermally and sonically non-metallic material for covering the original roof surface to be protected, and a relatively thin lamina of flexible water-proof non-metallic material overlying said blanket, at least the upper surface of said lamina being highly reflective of radiant energy, the margins of said lamina being underfolded and adhered to provide a reinforced selvage for fastening to the upper surface of a building, sail selvage having screw-receiving grommets at spaced points therealong.

2. Structure according to claim 1 and additionally comprising a shallow-channel relatively stiff thin strip for covering said grommets and screw heads.

3. Structure according to claim 2 and additionally comprising a gutter channel adapted for cementing to the lower margin of said selvage and for receiving the lower edge of said trim strip.

* * * * *